June 9, 1942.    R. L. ESLINGER    2,285,810
BRAKE OPERATING MECHANISM
Filed June 6, 1941
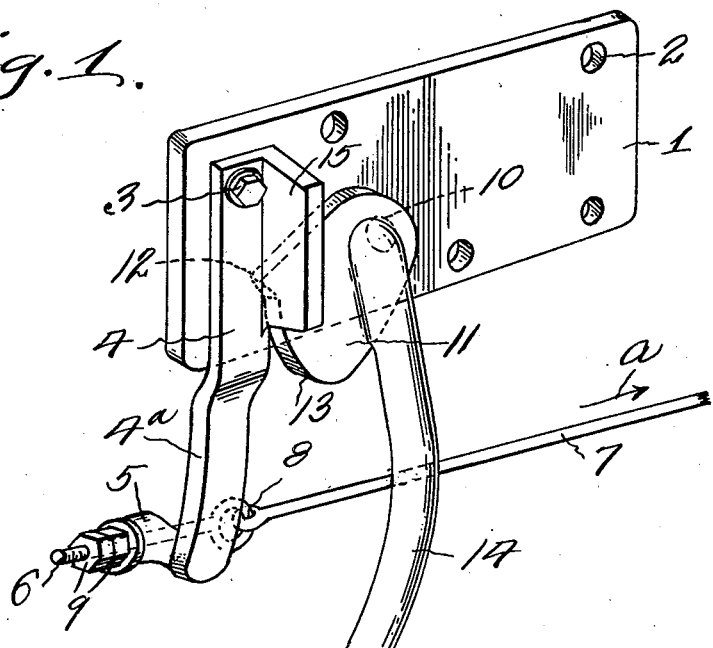
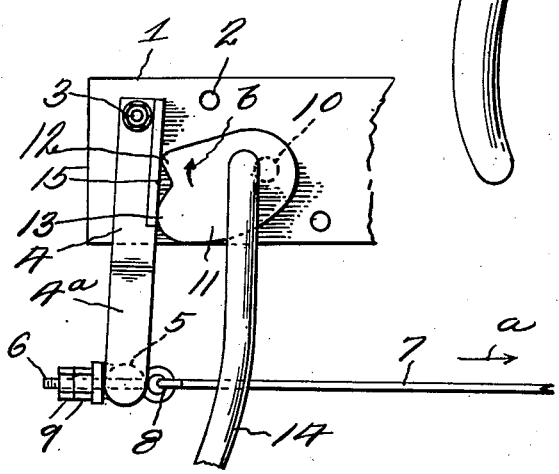
Inventor
Russel L. Eslinger
By Philip A. Terrell
Attorney Patented June 9, 1942

2,285,810

UNITED STATES PATENT OFFICE 2,285,810

BRAKE OPERATING MECHANISM

Russel L. Eslinger, Harrisburg, Pa., assignor of thirty-five one hundredths to Thomas C. Zerbe, Harrisburg, and thirty one hundredths to Alfonso A. Graybill, Steelton, Pa.

Application June 6, 1941, Serial No. 396,925

1 Claim. (Cl. 74—523)

The invention relates to brake operating mechanisms of the lever type, and has for its object to provide a device of this kind particularly adapted as a parking or emergency brake mechanism, and comprising a partially rotated cam cooperating with a pivoted lever controlling the brake mechanism.

A further object is to provide the lever engaging end of the cam with spaced lever engaging surfaces, one of which passes through a horizontal line between the pivotal point of the cam and the adjacent portion of the lever so that the cam will be held in set position, for instance when parking a vehicle and in a manner whereby it will not jar loose.

A further object is to proportion the lower lever engaging portion of the cam so that in case of emergency the cam can be further rocked for increasing the braking operation.

A further object is to provide adjusting means connecting the brake pull rod to the lever for taking up any slack which may develop therein.

A further object is to connect the operating lever to the cam at a point between its free end and the cam pivotal point for increasing the leverage thereof.

A further object is to provide a brake operating mechanism comprising a partially rotated cam cooperating with a pivoted lever controlling the brake mechanism and means carried by the pivoted lever in the path of the operating handle for preventing excessive rotation of the cam.

With the above and other objects in view the invention resides in the combination and arrangement of parts as hereinafter set forth, shown in the drawing, described and claimed, it being understood that changes in the precise embodiment of the invention may be made within the scope of what is claimed without departinfrom the spirit of the invention.

In the drawing:

Figure 1 is a perspective view of the brake operating mechanism.

Figure 2 is a view in elevation of the brake operating mechanism.

Referring to the drawing, the numeral 1 designates a conventional form of supporting plate, adapted to be secured to the inside of the automobile body within easy reach of the operator. This plate is provided with apertures 2 for the reception of securing means.

Hingedly connected at 3 to the plate 1 is a downwardly extending lever 4, the lower end of which is provided with an offset portion 4a having an apertured lug 5, through which lug an eye bolt 6 extends. The control rod or cable 7 is connected to one end of the eye bolt as shown at 8, and is urged in the direction of the arrow $a$ by the usual brake mechanism. Threaded on the eye bolt 6 are adjusting nuts 9 by means of which any slack in the rod or cable 7 may be taken up, therefore it will be seen a close adjustment can be maintained at all times.

Pivotally connected at 10 to the plate 1 is a cam 11, the free end of which is provided with spaced shoulders 12 and 13, which shoulders, when the cam is in braking position for parking purposes, as shown in Figure 2, engage one side of the lever 4 after setting the brake and it will be seen the shoulder 12 is above a horizontal center through the pivotal point 10, and the shoulder 13 below said horizontal center, therefore there will be no danger of the brake being released incident to jar or the like, now the common difficulty with the rack and dog mechanism in use. It will be noted that the shoulder 13 is at a greater distance from the center of the pivotal point 10 than the shoulder 12 when the brake is set, consequently in case of emergency while driving additional setting of the brakes may be obtained by a further rocking of the cam in the direction of the arrow $b$. The cam 11 is provided with an operating lever 14 which may be welded thereto or formed integral therewith if desired. Operating lever 14 is carried by the cam between its pivotal point 10 and its free end to increase the leverage. The operating lever 14 is also in the path of an outwardly extending flange 15 carried by the lever 4, hence the flange 15 will limit the movement in braking direction of the operating lever 14 on the emergency operation when the projection 13 is forced upwardly from the position shown in Figure 2.

From the above it will be seen that a cam operated brake control mechanism is provided, which is simple in construction and one wherein the braking operation is obtained with a limited movement of the cam operating lever and the parts are reduced to a minimum so the device can be cheaply manufactured and sold.

The invention having been set forth what is claimed as new and useful is:

A brake operating mechanism comprising a pivoted lever, a brake operating member member connected to the pivoted lever, a pivoted cam adjacent one side of said pivoted lever and having its free end extending towards said pivoted lever, said free end of the cam having spaced shoulders, one of said spaced shoulders being adapted to pass through a line between the pivotal point of the cam and the pivoted lever for holding said cam against retrograde movement under the tension of the set brake mechanism, said other shoulder of the cam being further from the center of the pivotal point of the cam than the other shoulder and forming additional braking means upon further rotation of the cam, an operating lever carried by said cam at a point between the pivotal point of the cam and its free end and an outwardly extending stop member carried by the pivoted lever in the plane of the operating lever.

RUSSEL L. ESLINGER